United States Patent
Schmitt et al.

(12) 
(10) Patent No.: US 6,409,955 B1
(45) Date of Patent: Jun. 25, 2002

(54) SHUTHEIGHT ADJUSTER FOR A SPRUE BAR

(75) Inventors: Stefan Gunther Schmitt, Tawern; Heinz Walter Reulecke, Saarlouis, both of (DE)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/450,793

(22) Filed: Nov. 29, 1999

(51) Int. Cl.⁷ .............................................. B29C 45/32
(52) U.S. Cl. ................ 264/297.2; 264/328.1; 264/328.8; 264/328.11; 425/557; 425/572; 425/581; 425/588
(58) Field of Search ............. 264/40.1, 40.5, 264/297.2, 328.1, 328.8, 328.7, 328.11; 425/555, 557, 559, 561, 572, 573, 574, 577, 581, 588

(56) References Cited

U.S. PATENT DOCUMENTS

| | | |
|---|---|---|
| 3,843,295 A | 10/1974 | Greenberg et al. |
| 3,934,626 A | 1/1976 | Hall |
| 4,212,626 A | 7/1980 | Gellert |
| 4,299,791 A | 11/1981 | Aoki |
| 4,473,347 A | 9/1984 | Terashima |
| 4,971,747 A * | 11/1990 | Sorensen ................ 264/297.2 |
| 5,130,075 A | 7/1992 | Hara et al. |
| 5,229,145 A | 7/1993 | Brown et al. |
| 5,458,843 A | 10/1995 | Brown et al. |
| 5,460,510 A | 10/1995 | Gellert |
| 5,464,579 A | 11/1995 | Brown et al. |
| 5,846,472 A * | 12/1998 | Rozema et al. .......... 264/297.2 |
| 5,910,327 A | 6/1999 | Schad et al. |

FOREIGN PATENT DOCUMENTS

| | | |
|---|---|---|
| CH | 625461 | 9/1981 |
| EP | 6000848 | 11/1994 |
| EP | 0 911 139 | 4/1999 |
| FR | 2152932 | 4/1973 |
| JP | 51102047 | 9/1976 |
| JP | 62035817 | 2/1987 |
| JP | 5-345335 | 12/1993 |

OTHER PUBLICATIONS

"Process of Automatic Molds", *Japan Plastics Age*, vol. 12, No. 6, Jun., 1974, pp. 42–46.

* cited by examiner

Primary Examiner—Jill L. Heitbrink
(74) Attorney, Agent, or Firm—Bachman & LaPointe, P.C.

(57) ABSTRACT

The present invention relates to a sprue bar assembly for use with a number of different injection molding machines. The sprue bar assembly comprises a fixed sprue bar section having a first channel through which molten material, such as a plastic resin, flows. The first channel communicates with the outlet of a source of the molten material. The sprue bar assembly further comprises an adjustable sprue bar section having a second channel through which molten material flows and a powered unit for holding the adjustable sprue bar section in contact with the fixed sprue bar section so that molten material can flow from the first channel to the second channel without leaking and for changing the length of the sprue bar assembly as needed to accommodate molds of different shutheights. In a preferred embodiment of the present invention, the fixed sprue bar section and the adjustable sprue bar section are each provided with a valve gate for preventing drooling or leakage of the molten material when the two sections are separated.

61 Claims, 12 Drawing Sheets

SHUTHEIGHT ADJUSTER FOR A SPRUE BAR

BACKGROUND OF THE INVENTION

The present invention relates to an improved sprue bar assembly having a mechanism for automatically adjusting the length of the sprue bar in a stack mold, or stack mold carrier assembly, to accommodate molds of different shutheight. The improved sprue bar assembly of the present invention can also be used to facilitate injection compression and/or coining processes in stack molds.

Stack molds typically rely upon hot runner systems for conveying melted plastic to their mold cavities. Generally, a hot runner manifold is mounted in the moving center section of the stack mold or is fastened to a movable stack mold carrier that may be part of the machine. A sprue bar extends from the hot runner manifold and seals to the machine injection nozzle. This sealed connection is typically broken and remade for each molding cycle. When the mold must be opened to eject the molded parts, the pressurized hot runner manifold and sprue bar melt channels must be relieved of pressure in order to prevent drool or leakage of the plastic when the melt channel sections must be separated. However, this pressure relief must not allow air to be introduced into the melt stream when the mold is closed for the next injection cycle.

A stack mold carrier is sometimes installed in a machine to allow a variety of different stack molds to be installed or removed quickly. The carrier typically has a linkage system for opening and closing the various mold sections and sometimes includes the hot runner and sprue bar so that only the mold cavities and cores need be changed. If a mold core and cavity set is installed that has a different shutheight from the set it is replacing, a different sprue bar of suitable length must also be installed to match the new shutheight. This is both expensive and time consuming.

Several techniques have been used to solve the problem of stack mold hot runner depressurization. Swiss patent 625,461 to Hotz illustrates a stack mold hot runner manifold having a retractable pin in the melt channel which when retracted increases the volume of the melt channel, thereby depressurizing it prior to the mold opening. After closing for the next cycle, the pin must be advanced in order to be ready for the next depressurizing action. Japanese Patent Document No. 62-35817 illustrates a similar depressurizing pin.

French Patent No. 2,152,932 illustrates a spring loaded bushing on an offset sprue bar that can slide away from the hot runner nozzle, thereby increasing the volume of the melt channel to allow depressurization as the mold opens. The mold closing action recompresses the springs for the next cycle. Further examples of stack mold applications are shown in U.S. Pat. Nos. 5,458,843 and 5,464,579, both to Brown. Also, FIG. 29 in an article "Progress of Automatic Molds" from *Japan Plastics Age* shows a spring loaded bushing used in a stack mold application.

Other manifold depressurization mechanisms are illustrated in U.S. Pat. No. 4,299,791 to Aoki, U.S. Pat. No. 3,934,626 to Hall and Japanese Patent Document No. 51-102047. Each of these documents shows spring loaded bushings. U.S. Pat. No. 4,473,347 to Terashima illustrates a pair of opposed sliding blocks that create additional melt channel volume in the manifold to effectively depressurize the manifold.

Allowed co-pending U.S. patent application Ser. No. 09/054,692 to Teng et al., now U.S. Pat. No. 6,027,681 which is hereby incorporated by reference herein, illustrates a stack mold carrier linkage system having a linkage that can accommodate molds of different shutheights. There is no teaching in this application however of adjusting the sprue bar length to suit the differing mold shutheights.

U.S. Pat. No. 5,910,327 to Schad illustrates a telescoping sprue bar that allows a shorter sprue bar to be used in a stack mold. However, the Schad design does not facilitate adjustment to accommodate differing mold shutheights. Japanese Patent Document No. 6-000848 also illustrates a telescoping sprue bar.

U.S. Pat. No. 3,843,295 to Greenberg illustrates an adjustable injection nozzle in a stack mold application whereby the nozzle can be lengthened by using springs or fluid pressure. In this patent, multiple nozzles protrude through the center section of the stack mold to supply resin to the mold cavity sets distant from the machine's injection unit. This impractical mold layout does not work in situations where the molds are to be changed in a manner that minimizes time and cost. Also, the nozzle extensions that pass through the mold set adjacent the machine's injection unit in order to reach the distant mold set are impediments when the mold sets open and must eject their molded parts.

U.S. Pat. No. 4,212,626 to Gellert illustrates two opposed hot runner valve gated nozzles that are used to control the melt flow across the parting line of a stack mold, thereby preventing leakage and drool when the mold opens. Decompressing the manifold is not discussed and such a design would not be easily adjustable for molds of differing shutheights.

Co-pending U.S. patent application Ser. No. 09/173,783 now U.S. Pat. No. 6,135,757 illustrates the concept of providing grooves on the outer surface of valve gate stem to facilitate closing the stem against compressed melt and reducing the heat loss from the stem. Providing a channel within the stem to provide a venting route for excess melt is not contemplated.

Injection compression molding and coining are processes whereby melted resin is fed into a mold that is not completely closed and clamped such that after feeding a metered amount of resin into the mold, the supply is shut off and the mold closed and clamped compressing the melt to fill the cavity entirely. This process provides the molded part with enhanced properties, typically less residual stress and sometimes allows parts of thinner cross section to be molded. U.S. Pat. No. 5,130,075 to Hara illustrates such a process in which resin is fed into a mold that is allowed to open during filling and then is closed and clamped to complete the process. Processes like injection compression and coining have not previously been possible to perform in stack mold applications because the movement of the mold during the filling and/or compressing stage could not be facilitated with a fixed length sprue bar.

SUMMARY OF THE INVENTION

Accordingly, it is an object of the present invention to provide a sprue bar assembly that accommodates molds of different shutheights.

It is a further object of the present invention to provide a sprue bar assembly as above that decompresses the melt channel.

It is yet a further object of the present invention to provide improved compression and/or coining processes for making molded articles.

The foregoing objects are attained by the sprue bar assembly of the present invention.

In accordance with the present invention, a sprue bar assembly is provided for use with an injection molding machine having at least one mold and for accommodating different mold shutheights. The sprue bar assembly comprises a fixed sprue bar section having a first channel through which molten material, such as a plastic resin, flows. The first channel communicates with the outlet of a source of the molten material. The sprue bar assembly further comprises means for accommodating different mold shutheights. The accommodating means comprises an adjustable sprue bar section having a second channel through which molten material flows and powered means for holding the adjustable sprue bar section in contact with the fixed sprue bar section so that molten material can flow from the first channel to the second channel without leaking. In a preferred embodiment of the present invention, the fixed sprue bar section and the adjustable sprue bar section are each provided with a valve gate for preventing drooling or leakage of the molten material when the two sections are separated.

The adjustable sprue bar assembly of the present invention can be used in a number of different molding machines for performing a plurality of different molding processes. For example, the adjustable sprue bar assembly of the present invention can be used to facilitate injection compression and/or coining processes in stack molds.

Other details of the sprue bar assembly of the present invention and its applications, as well as other objects and advantages attendant thereto, are set forth in the following description and the accompanying drawings in which like reference numerals depict like elements. dr

BRIEF DESCRIPTION OF THE DRAWINGS

FIG. 7A is a side view of an alternate sprue bar nozzle assembly with a valve gate in an open position;

FIG. 7B is a side view of the alternate sprue bar nozzle assembly of FIG. 7A with the valve gate in a closed position;

DETAILED DESCRIPTION OF THE PREFERRED EMBODIMENT(S)

Figure 1:
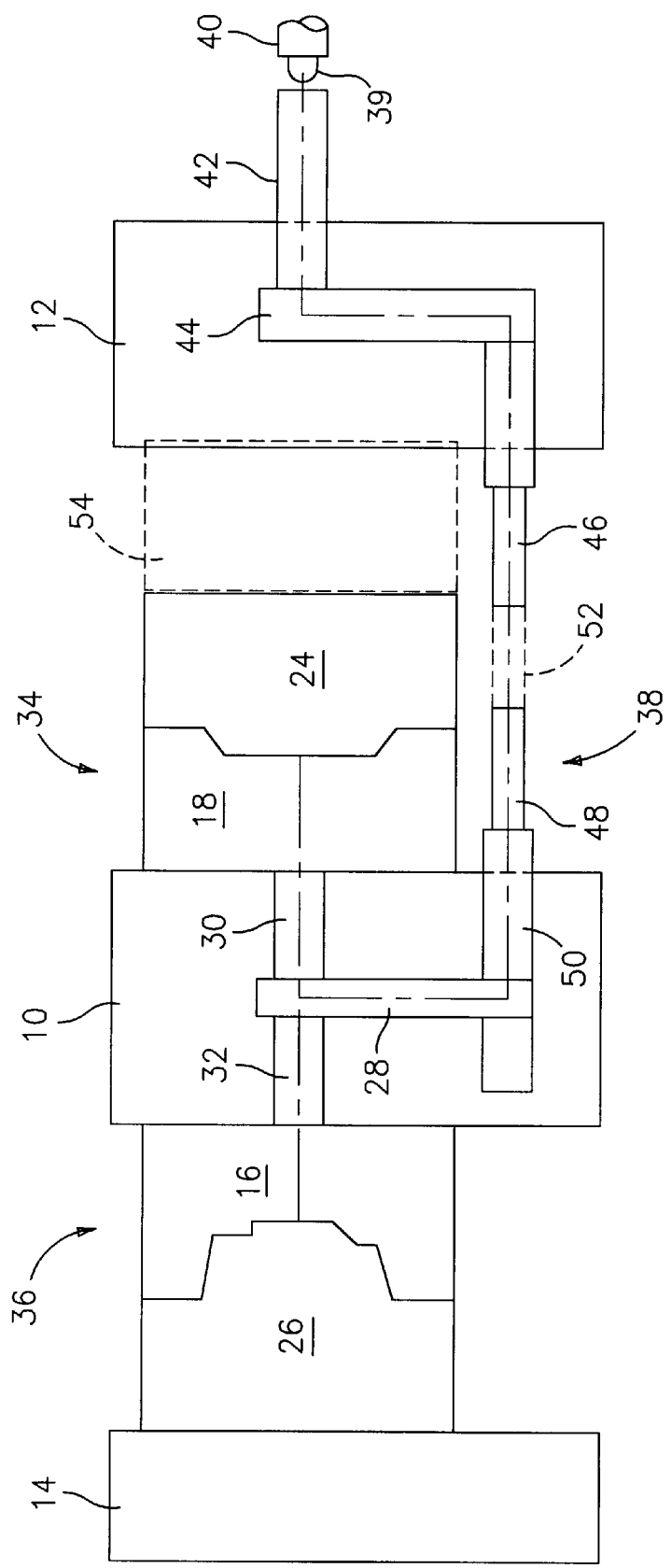
FIG. 1 is a side view of a stack mold using a stack mold carrier and having a sprue bar assembly in accordance with the present invention.

Referring now to the drawings, FIG. 1 illustrates a stack mold carrier and two mold sets installed therein. The stack mold carrier includes a center platen 10 positioned between a stationary platen 12 and a moving platen 14. The center platen 10 has mold halfs 16 and 18 respectively attached to opposed faces 20 and 22. The stationary platen 12 has a mold half 24 attached to it and the moving platen 14 has mold half 26 attached to it. The mold halfs 16 and 26 form a first mold set 36 and the mold halfs 18 and 26 form a second mold set 34. Typically, the mold halfs 16 and 18 comprise mold cavity halfs and the mold halfs 24 and 26 comprise mold core halfs; however, if desired mold halfs 16 and 18 could be mold core halfs and mold halfs 24 and 26 may comprise mold cavity halfs. As shown in FIG. 1, the mold sets 34 and 36 are each in a mold closed position.

A linkage system (not shown) is attached to the platens 10, 12 and 14 to effect movement of the molds and platens in a known fashion. For example, the linkage system can operate the molds so that they simultaneously open or close. Alternatively, the linkage system could operate the molds in a desynchronized cycle where each mold set opens and closes at a different time from the other. Any suitable linkage system known in the art may be used to effect movement of the molds and platens.

As shown in FIG. 1, the center platen 10 contains a hot runner melt transfer system comprising a manifold 28 and sprue bushings 30 and 32 for feeding molten material, such as molten plastic resin(s), to the mold sets 34 and 36 respectively. Beneath or beside or above the mold set 34 is a sprue bar assembly 38 that connects the manifold 28 to the outlet nozzle 39 of the injection molding machine's injection unit 40. As will be discussed hereinafter, sprue bar assembly is adjustable in length to accommodate molds of different shutheights and/or to accommodate different operational cycles of the molds.

The adjustable length sprue bar assembly 38 in accordance with the present invention includes a sprue bush 42, a fixed manifold 44 connected to the sprue bush 42, a fixed sprue bar section 46 connected to the manifold 44, a movable or adjustable sprue bar section 48, and a sprue bar mounting section 50 attached to the center platen manifold 28. The fixed manifold 44 may be mounted within the stationary platen 12 or onto a surface of the stationary platen 12. Alternatively, the fixed manifold 44 may be mounted within the mold set 34.

The adjustable sprue bar assembly 38, in accordance with the present invention, has the ability to increase or decrease its length while maintaining a sealed molten material passage throughout. In FIG. 1, this ability to extend is indicated by the dotted line portion 52, which indicates that the sprue bar assembly 38 has been extended to accommodate the increased shutheight thickness, indicated by the dotted line portion 54 in mold set 34.

Figure 2:
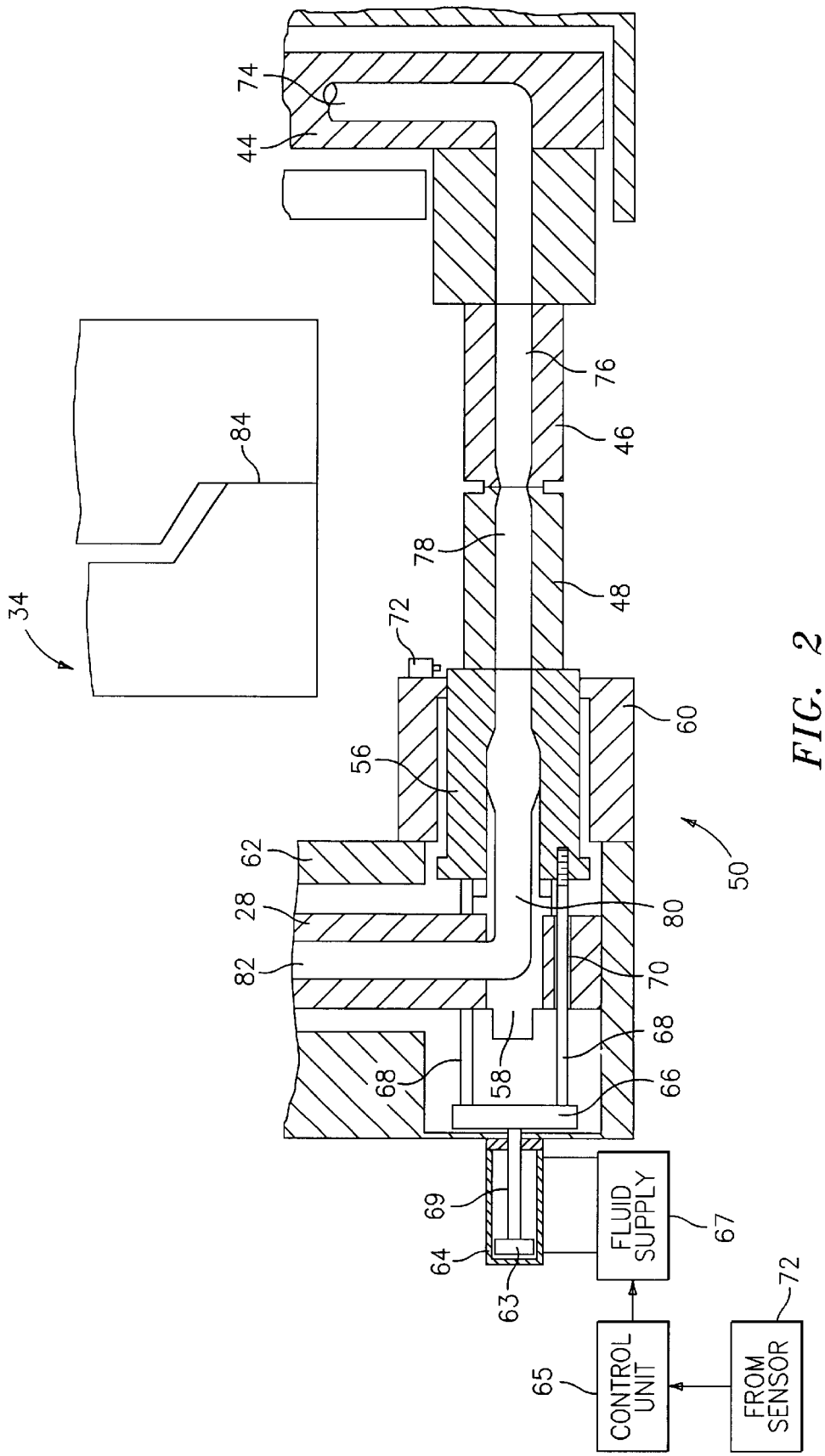
FIG. 2 is a side view in partial cross section of the sprue bar assembly in accordance with the present invention while a mold is in a closed position.

FIGS. 2–5 illustrate how the adjustable sprue bar assembly 38 of the present invention operates in a conventional stack mold injection molding application. In FIG. 2, the mold set 34 is shown in the mold closed position. The adjustable sprue bar section 48 is fastened to a movable sprue bar sleeve 56, which slides over manifold spigot 58 which is fastened into the manifold 28. Movable sleeve 56 is guided by sprue bar mounting bushing 60 which is fixed to the manifold plate 62 which, in turn, is bolted or otherwise fastened to a mold shoe (not shown) or the center platen 10. Sleeve 56 is caused to move by operation of a powered unit such as cylinder 64 by a control unit 65.

Figure 3:
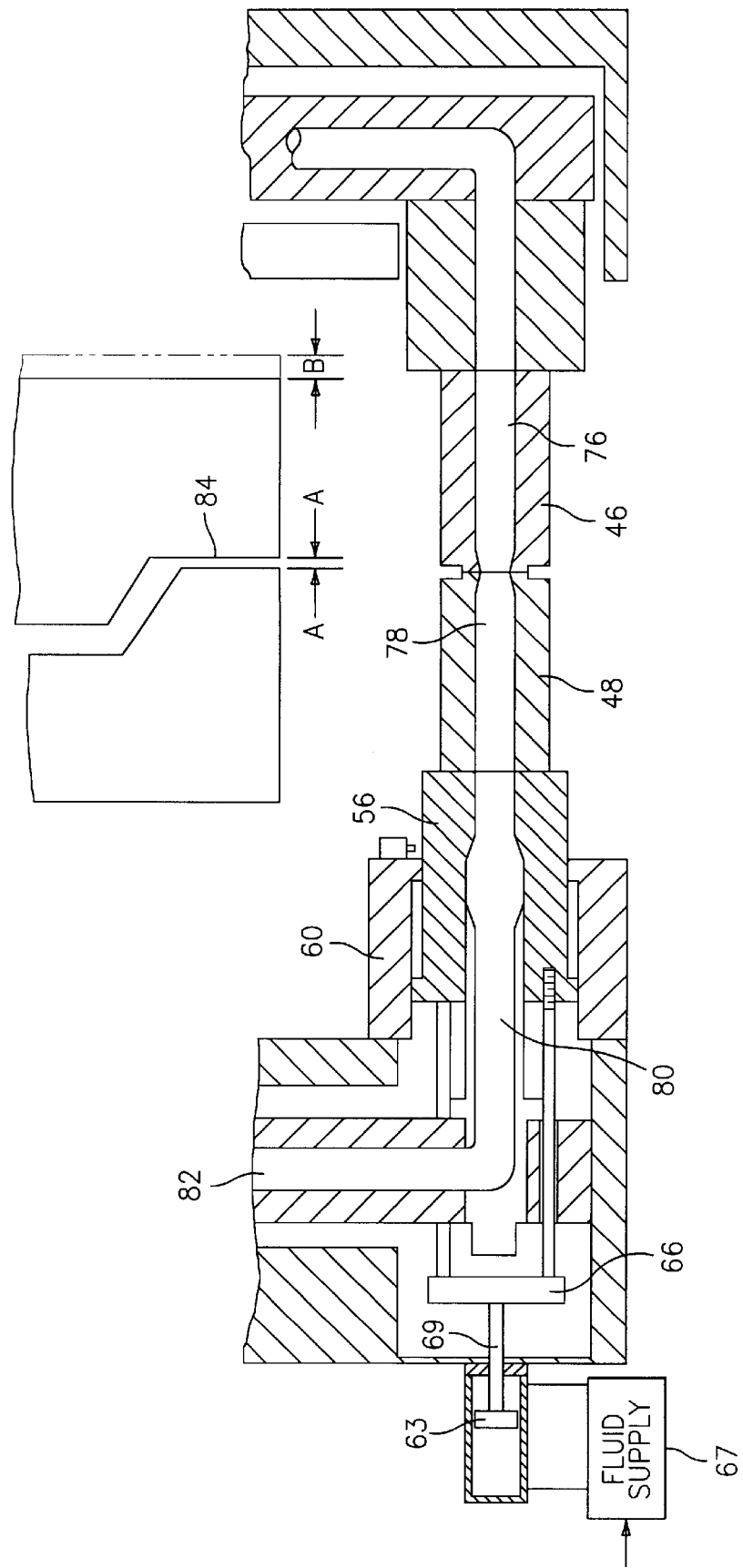
FIG. 3 is a side view in partial cross section of the sprue bar assembly in accordance with the present invention while a mold having an increased shutheight is in a closed position.
Figure 4:
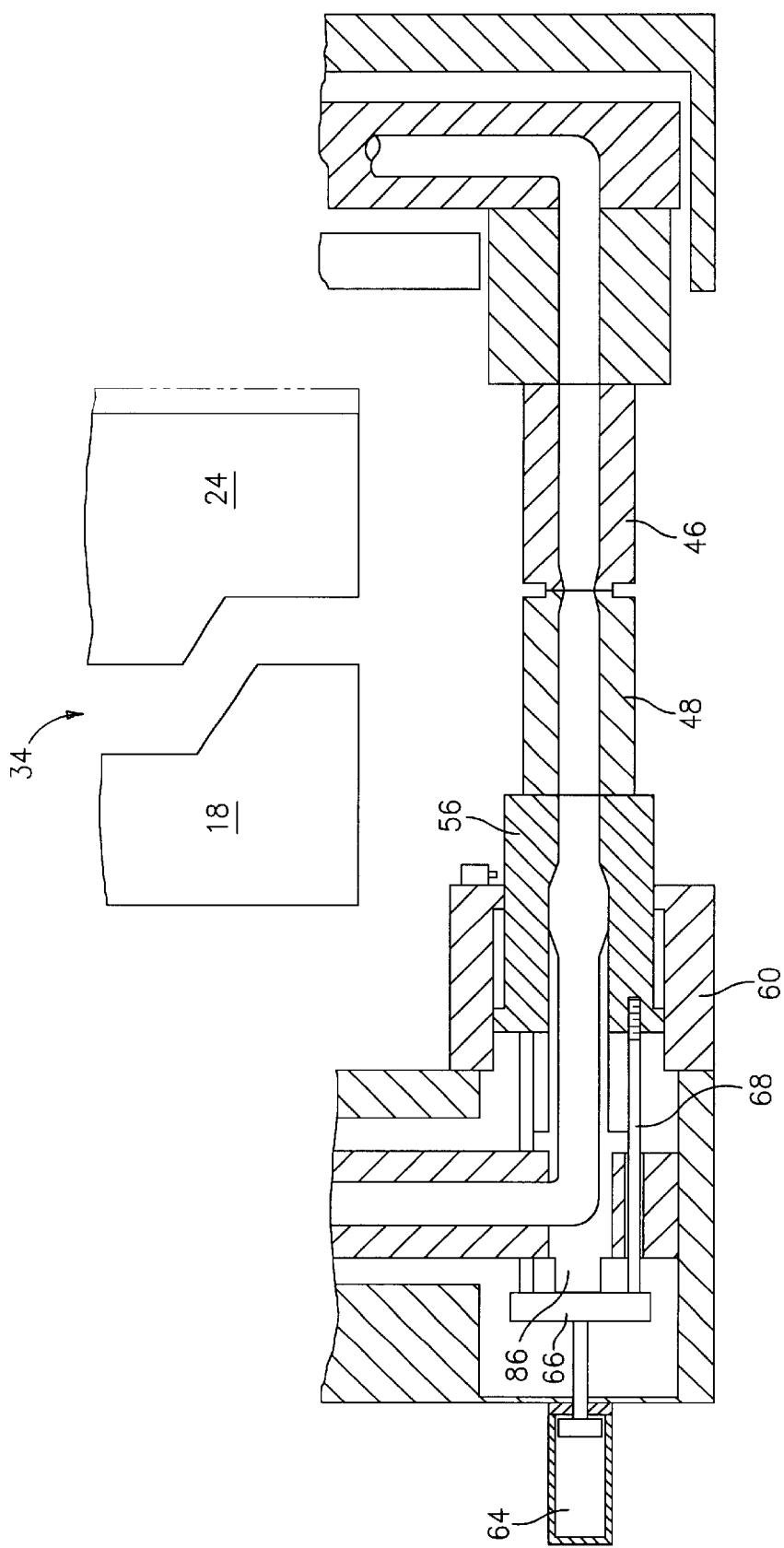
FIG. 4 is a side view in partial cross section of the sprue bar assembly in accordance with the present invention while a mold is in a partially mold open position.
Figure 5:
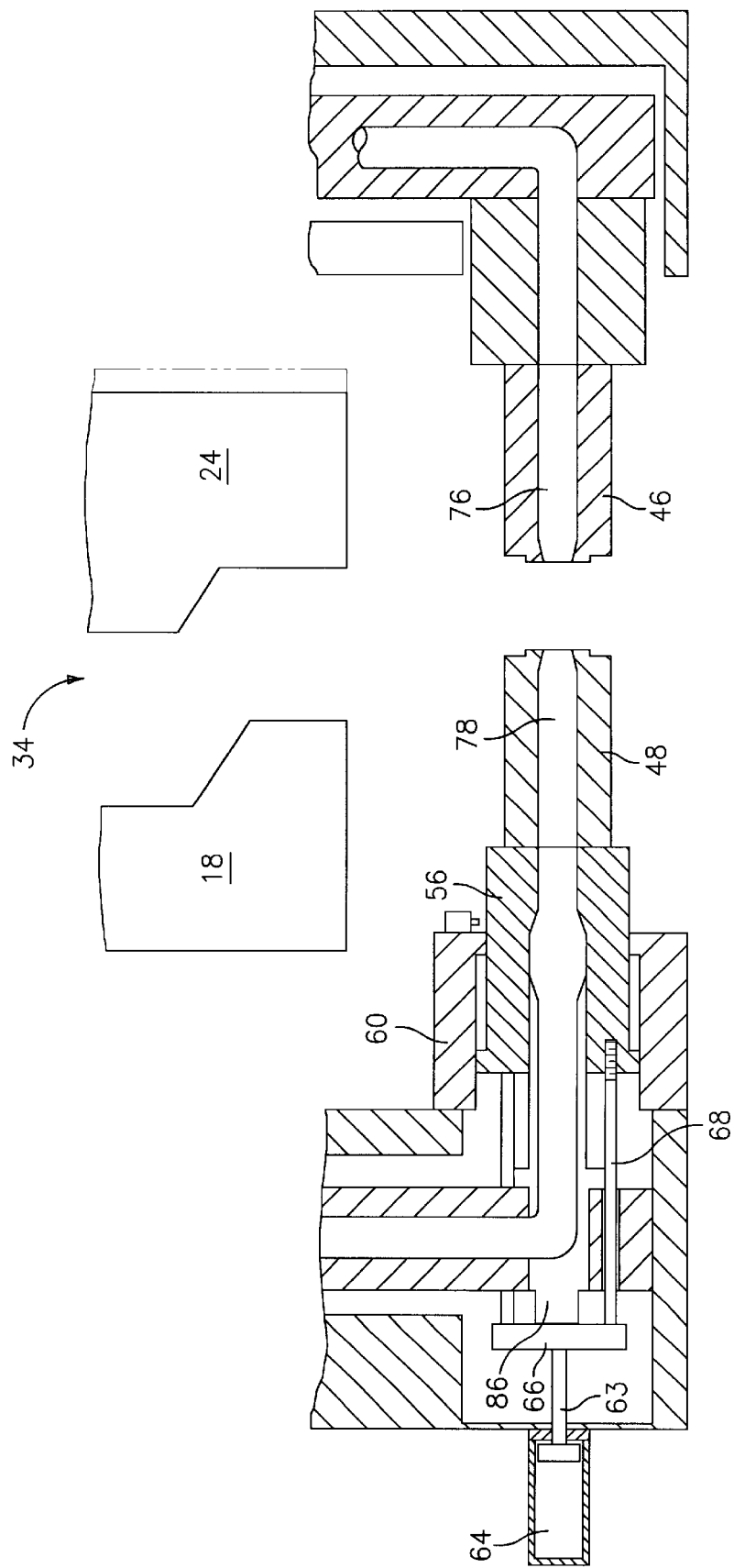
FIG. 5 is a side view in partial cross section of the sprue bar assembly in accordance with the present invention while a mold is in a final mold open position.

As shown in FIG. 2, the cylinder 64 communicates with a source of fluid 67 and has a piston head 63 which reciprocates between a retracted position shown in FIG. 2 and an extended position shown in FIGS. 3, 4 and 5. The control unit 65 for operating the cylinder 64 may comprise any suitable closed loop servo control unit or control circuit known in the art for causing the cylinder 64, and hence the piston head 63, to move as a function of the position of the mold(s) during the molding cycle. For example, the control unit 65 can be a computer which is programmed to operate the cylinder 64. Inputs to the control unit 65 may include some or all of the following: (1) positions of the machine's moving platen and stack mold carrier (from these one would know the positions of the mold sections that are bolted to these items); (2) position of the movable sleeve 56 with respect to the manifold 28; (3) the injection unit position of the feedscrew and/or injection cylinder and injection pressure; and (4) timing of injection start sequence, switch to hold pressure, end of hold pressure, start of mold opening, and end of mold closing. These inputs may be transmitted from appropriate sensors (not shown) and/or other control units to the control unit 65 using any suitable conventional means (not shown) known in the art. From some or all of these inputs, the control unit 65 determines when and how much the cylinder 64 should move and in which direction and with what degree of force. When the control unit 65 comprises a computer, any suitable program may be used to convert the input(s) into the desired output(s). The particular program that is used does not form part of the present invention.

As shown in FIGS. 2–5, the piston head 63 has a piston rod 69 which is connected or joined to the sleeve 56 via crosshead 66 and one or more connecting rods 68 that pass through clearance holes 70 in the manifold 28. In a preferred embodiment of the present invention, each of the connecting rods 68 is threaded into the sleeve 56.

While it is preferred to use a power unit, such as cylinder 64, to reciprocally move the sleeve 56, other devices such as a rack and gear drive or a lever mechanism driven by a servo motor could be used in lieu of a cylinder.

If desired, a position sensor 72 can be provided to monitor the position of sleeve 56 with respect to the bushing 60. Signals from the sensor 72 are transmitted to the control unit 65 and are used in the closed loop servo control system for controlling cylinder 64 to position the adjustable sprue bar section 48 in certain positions as needed.

If desired, the cylinder 64 can remain energized throughout the operation to constantly urge sleeve 56 to maintain a sealed connection between the adjustable sprue bar section 48 and the fixed sprue bar section 46. In operation, as the mold set 34 closes, the injection machine's clamp drive mechanism (not shown) overcomes the force of cylinder 64 and re-establishes a sealed connection upon closing. Unlike a spring, when used in the fashion of the present invention, a cylinder and a properly designed hydraulic or pneumatic circuit will provide a constant, and if required adjustable, sealing force over the entire stroke of movement, whereas a spring will create an increasing force as it is compressed further. This non-linearity of force severely limits the practical stroke over which a spring can be used. In an application such as providing an effective sealing action over a substantial distance, the spring approach will create wear and damage from excessive spring compressive forces.

In operation, when the mold set 34 is closed and clamped as shown in FIG. 2, control unit 65 energizes cylinder 64 to urge movable sleeve 56 to move in a direction so that adjustable sprue bar section 48 maintains a sealed connection with fixed sprue bar section 46 such that when molten material is injected through the melt channels 74, 76, 78, 80 and 82 in the sprue bar assembly at injection pressures, there is no leakage at the connection between the fixed and adjustable sprue bar sections 46 and 48. During this injection phase, it is possible for the mold to breath or for its parting line 84 to separate briefly by some small amount such as a distance "A" depicted by the arrows in FIG. 3. Should this occur, the energized cylinder 64 maintains a force on the sleeve 56 so that a sealed connection continues to be maintained in the sprue bar assembly 38.

If the mold structure should compress slightly under clamp tonnage, or a thicker or thinner mold shutheight is installed in the machine than was anticipated, the distance between the stationary platen 12 and the center platen 10 may increase or decrease. This distance change is represented in FIG. 3 by the dotted line and the arrows "B". Should the distance decrease, severe damage, such as bending the sprue bar, may result unless a similar decrease is made in the assembled length of the sprue bar assembly between these two platens. If the distance increases between the platens 10 and 12, the sprue bar sections in a conventional sprue bar assembly may not meet at all, allowing molten material leakage to occur. To compensate for these potential events and to eliminate the consequences caused by them, the cylinder 64 and sleeve 56 used in the sprue bar assembly of the present invention are provided with sufficient stroke to maintain melt channel sealing throughout a wide range of mold shutheight changes. In fact, this distance compensation feature of the present invention can be provided to accommodate molds of significantly different shutheights, up to 500 mm. for example.

FIG. 4 illustrates how the sprue bar assembly 38 of the present invention can be used to decompress the melt channel prior to separating its sections. In the case of a sprue bar assembly having an open melt channel configuration, as shown in FIG. 4, the mold 34 can begin opening prior to the sprue bar sections 46 and 48 separating. Additional stroke is provided in the assembly so that the sleeve 56 can extend until crosshead 66 contacts stop 86 positioned on the end of manifold spigot 58. This additional stroke provides an increase in volume in the melt channel as sleeve 56 slides over spigot 58, thereby reducing the melt pressure in the still sealed melt channel passages 74, 76, 78, 80 and 82 throughout the entire hot runner system from the outlet or injection nozzle 39 in the injection unit to the gates at the mold cavities. Sufficient stroke is provided to decompress the melt such that when the mold set 34 continues to open and the sprue bar sections 46 and 48 separate, as shown in FIG. 5, the molten material drooling from the open channels is minimized. Because the sleeve 56 can be moved by the control unit 65, the stroke of sleeve 56 can be adjusted to suit this condition. Overstroking sleeve 56 can introduce air into the melt channel which can cause undesirable molding problems. Therefore, the control unit 65 preferably is one where the operator can tune the distance sleeve 56 strokes to optimize the system's performance.

To complete the molding cycle, after the molded part(s) has been ejected from the open mold, the mold is closed again and the sprue bar assembly 38 resealed at the connection between sections 46 and 48. The position of the sleeve 56 is reset by cylinder 64 and any excess melt in the channel displaced by the reset is moved toward the mold gate. Timing the reset coincides with the initiation of injection of the molten material for the next molding cycle so that there is no interruption in the build up of injection pressure as the molten material is fed to the mold cavity or cavities.

Figure 6:
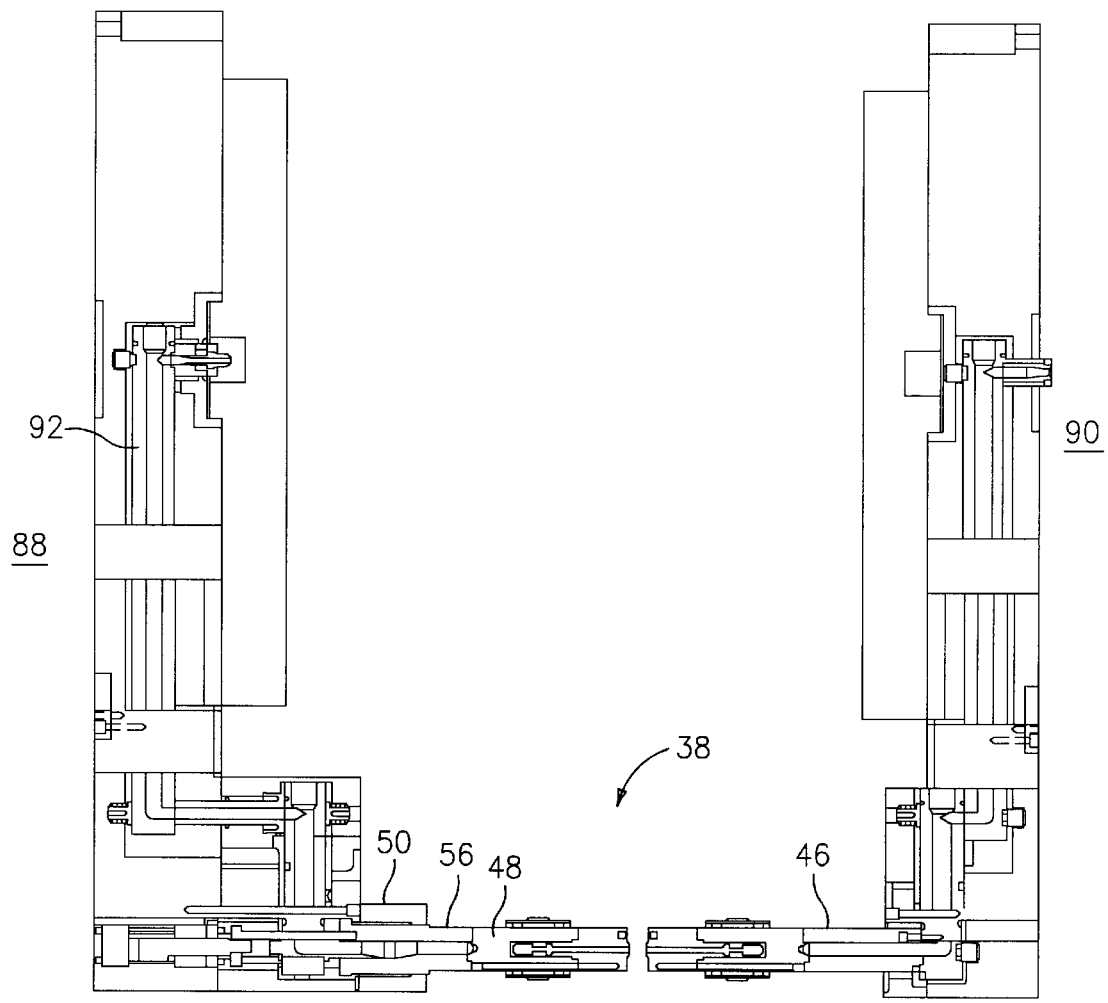
FIG. 6 is a top view of a hot runner assembly including a sprue bar assembly in accordance with the present invention.

FIG. 6 illustrates a hot runner assembly in the mold open position. The hot runner assembly includes the sprue bar assembly 38 of the present invention. In the configuration shown in this figure, there is a moving side 88 and a stationary side 90. Additionally, the moving side hot runner manifold 92 is mounted in a mold set mounted to the moving platen of the machine. Using this configuration, in combination with a second injection unit (not shown), two resins could be fed to the same mold cavity mounted between the two mold platens for the purposes of making coinjected multilayer parts, or parts having adjacent areas of differing materials. See U.S. Pat. No. 5,651,998 to Bertschi, which is incorporated by reference herein, as an example of this type of application. In this application, a stack mold is not being used but the sprue bar assembly 38 is being used to supply one of the resins to a moving platen as in a stack mold configuration.

In a preferred embodiment of the sprue bar assembly of the present invention, valve gate assemblies are mounted at the opposed ends of the fixed sprue bar section 46 and the movable sprue bar extension 48 such that the melt channel can be shut off when these sprue bar sections separate. The valve gate assemblies positively close the melt channels 76 and 78 to eliminate any chance of drool when sections 46 and 48 separate and also to prevent the ingress of air. In some molding applications in which cycle time or type of resin being used promotes drooling, the additional expense of this embodiment is justified in order to eliminate drool and save the cost of the wasted resin.

Figure 7C:
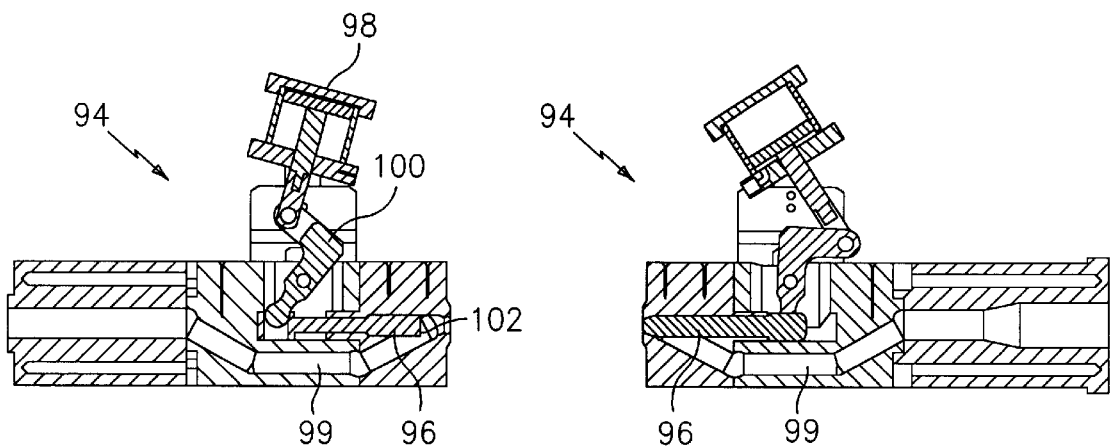
FIG. 7C is a sectional view of a tip of a valve stem used in the valve gate shown in FIG. 7A.
Figure 7C:
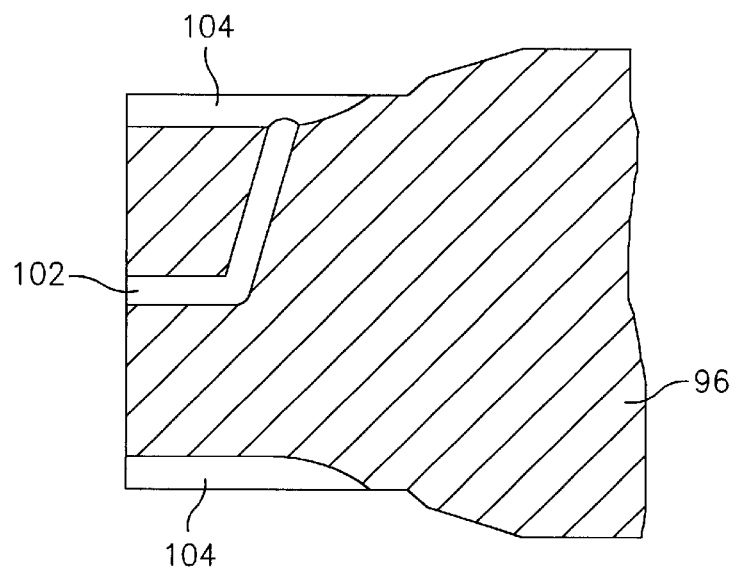

Referring now to the drawings, FIG. 7A illustrates a valve gate assembly 94 to be used with fixed sprue bar section 46 and movable sprue bar extension 48. The valve gate assembly 94 includes a passageway 99 through which molten material is transported and a reciprocally movable valve stem 96 for closing the passageway 99. A piston cylinder unit 98 and a pivotable link 100 connected to the piston rod of the unit 98 and the valve stem 96 move the valve stem 96 between the open position shown in FIG. 7A and the closed position shown in FIG. 7B. As shown in FIGS. 7A and 7C, the valve stem 96, installed in the end of each of the sections 46 and 48, is provided with a channel 102 at its tip through which molten material can travel to vent grooves 104 that surround the periphery of the stem 96. This is to allow any melt or molten material trapped between the ends of the valve stems after mold filling is complete to escape as the stems approach each other to shut off their respective channels in their respective sprue bar sections. The use of a valve gated approach in lieu of the open channel approach shown in FIGS. 2–5 helps ensure substantially drool free operation.

Figure 8:
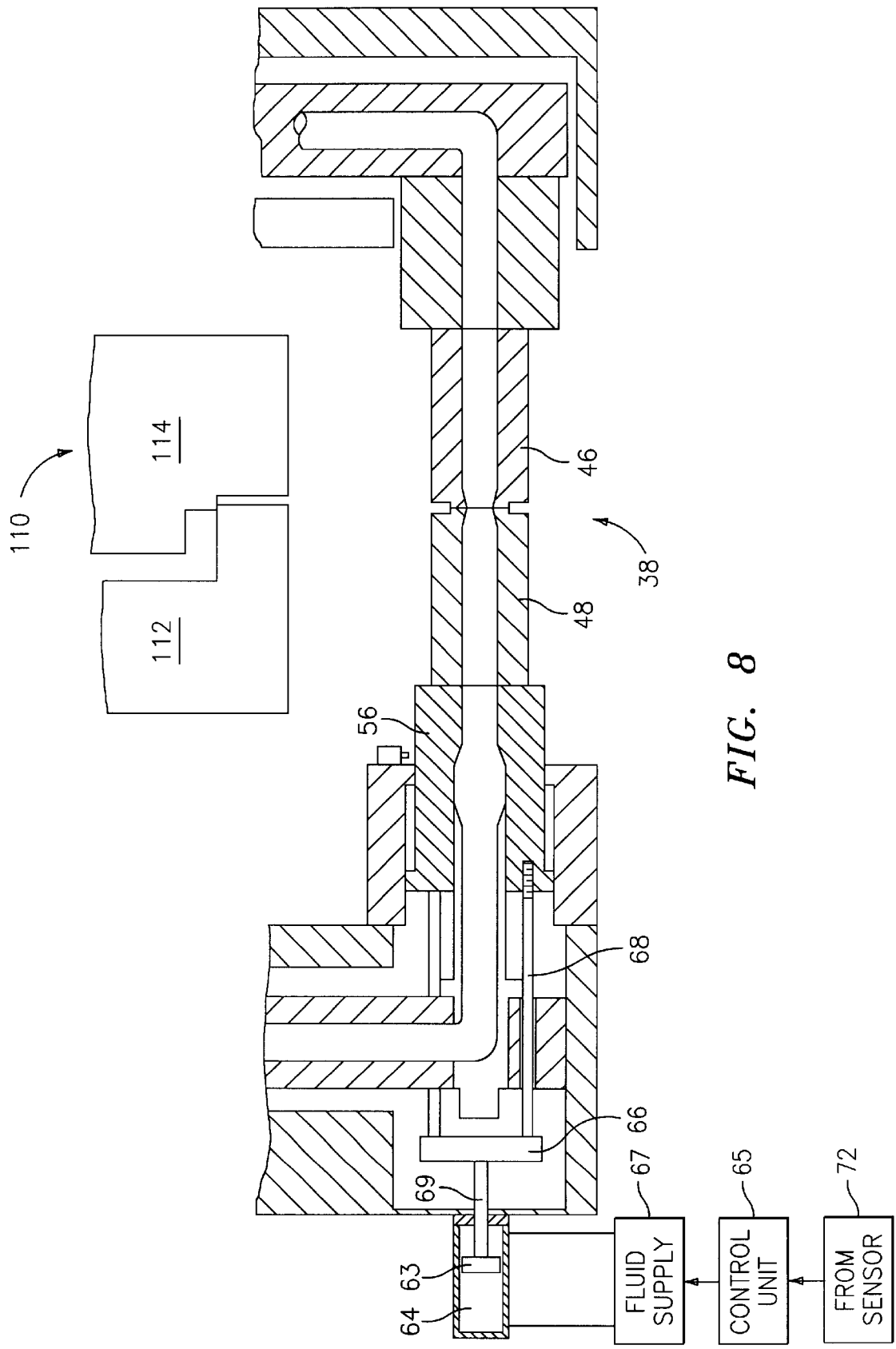
FIG. 8 is a side view in partial cross section of a sprue bar assembly in accordance with the present invention used in an injection-compression molding application in a mold filling stage.

FIGS. 8 through 11 illustrate how the sprue bar assembly 38 of the present invention operates in a stack mold injection compression and/or coining molding application. FIG. 8 shows the initial mold position for a coining operation in which a mold 110, formed by mold halfs 112 and 114, is partially closed. After a metered amount of a molten material, such as a plastic resin, is injected into the mold 110, the closing is completed to compress the melt and force it to complete the filling of the cavity in mold half 112. An alternate process is to start with the mold 110 closed but not clamped and to allow the mold 110 to open as molten material is fed into it under pressure. Then after a metered amount of molten material has been supplied to close the mold, once again compressing the molten material to force it to fill the mold cavity. This latter process-injection compression molding and to some extent coining can allow a thinner part to be molded than otherwise could be obtained. Because the distance between the machine platens changes in these processes, it has been difficult to perform them in a stack mold configuration when a fixed length sprue bar has been used to conduct the molten material to the center platen manifold 28. By using the adjustable length sprue assembly 38 of the present invention, it now becomes possible to provide a trouble free, reliable means for performing injection compression and coining processes in a stack mold.

Figure 9:
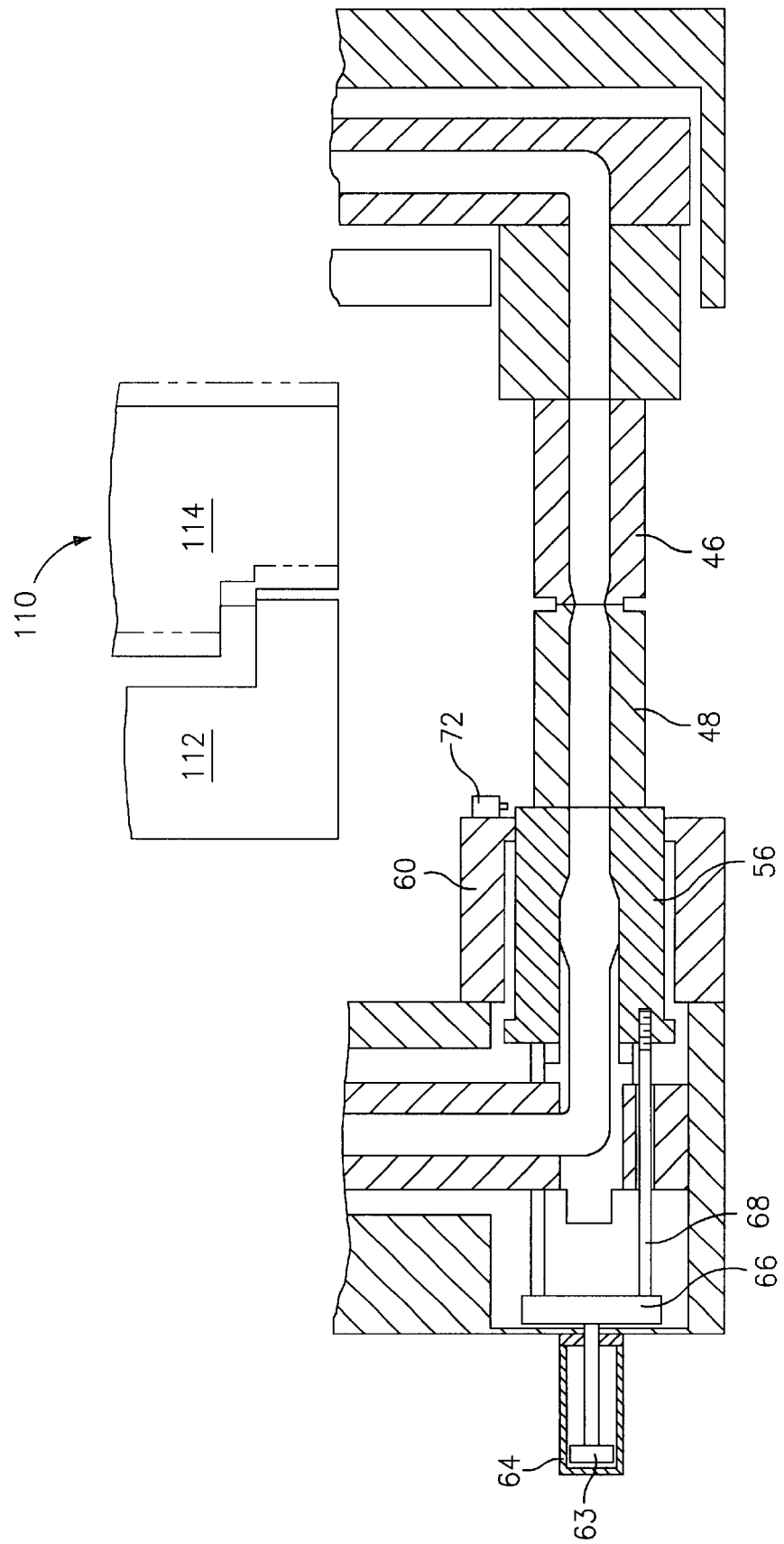
FIG. 9 is a side view in partial cross section of the sprue bar assembly of FIG. 8 in a compressing/coining stage.
Figure 10:
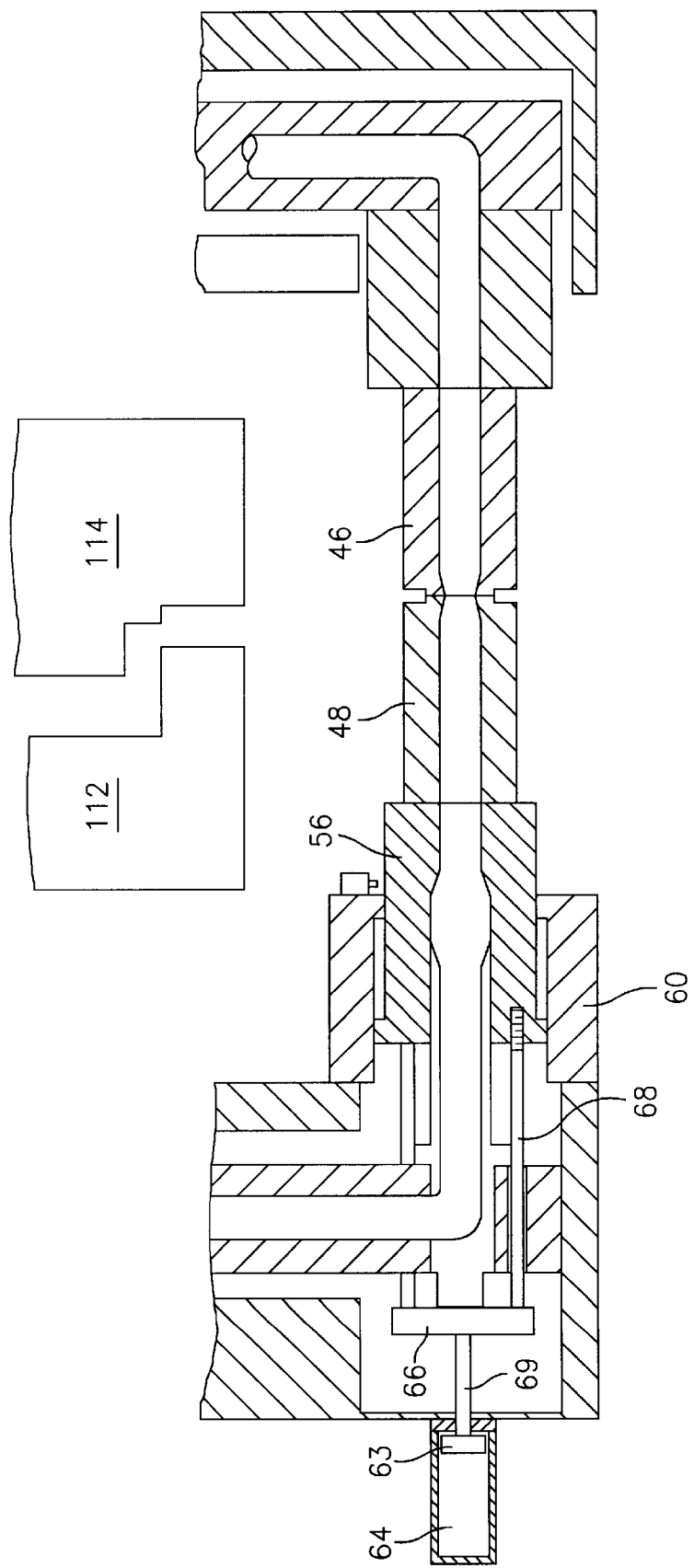
FIG. 10 is a side view in partial cross section of the sprue bar assembly of FIG. 8 in a partially mold open position.
Figure 11:
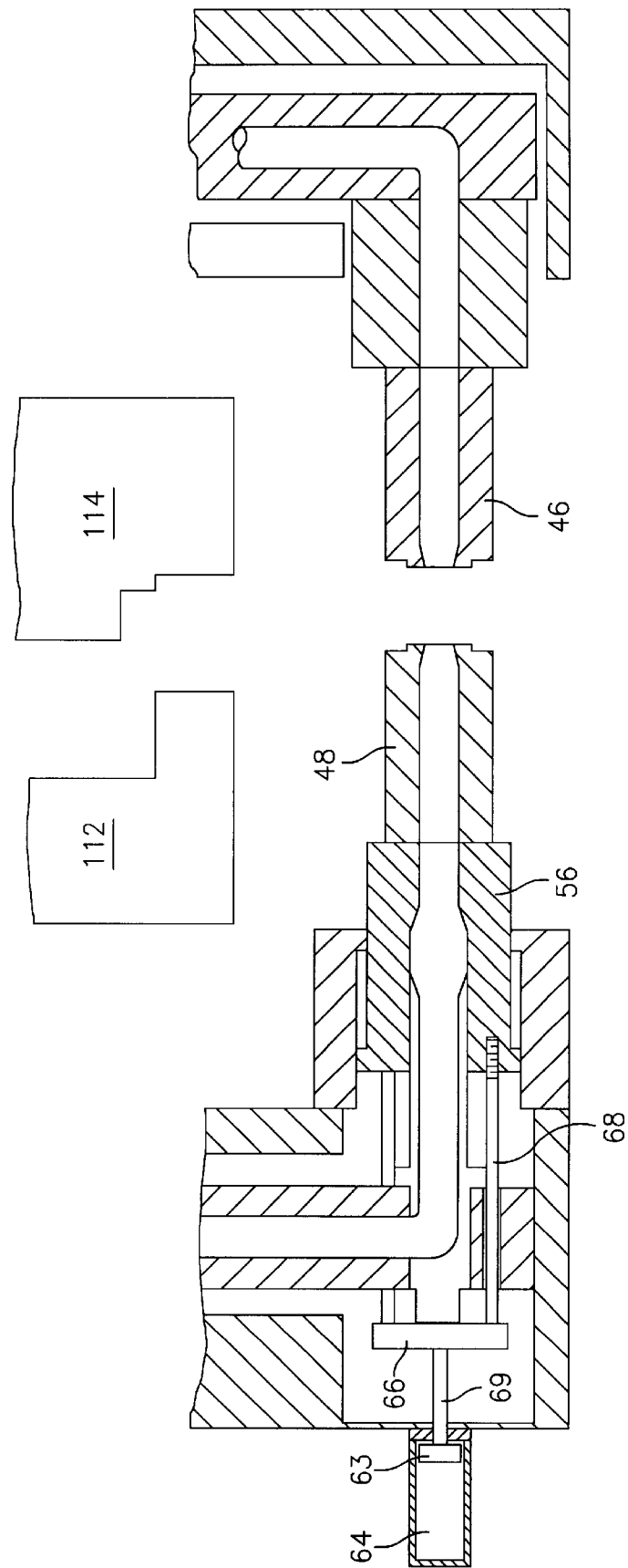
FIG. 11 is a side view in partial cross section of the sprue bar assembly of FIG. 8 in a final mold open position.

In operation, FIG. 8 shows the mold condition in which the metered amount of molten material is fed into the mold cavity via the sprue bar assembly 38. FIG. 9 shows the closing and compression stage of the mold where the distance the mold has moved is indicated by the dotted lines. Accordingly, the sprue bar assembly 38 has shortened in length by having the cylinder 64 allowing sleeve 56 to retract into the housing or mounting bushing 60. The sensor 72 keeps track of the position of the sleeve 56. FIG. 10 shows the melt decompression stage where the mold 110 is slightly open. As can be seen from this figure, the cylinder 64 is operated to move the sleeve 56 so that the extension 48 stays in contact with the sprue bar section 46. FIG. 11 shows the mold 110 open and the sprue bar sections 46 and 48 separated as previously described. If desired, the sprue bar sections 46 and 48 may be provided with the valve gate shown in FIGS. 7A–7C when the process or the plastic material being used justifies its benefits.

While the figures in the instant application show an offset sprue bar assembly, wherein the center line of the sprue bar is not the same as that of the mold, the present invention is equally applicable to sprue bars mounted with their channel centerlines coincident with machine clamp or mold centerlines. Similarly, the sprue bar assembly of the present invention can be applied to a machine injection unit mounted off-center, such as a Tandem machine wherein the injection unit may be positioned on top or to the side of the platen.

Figure 12:
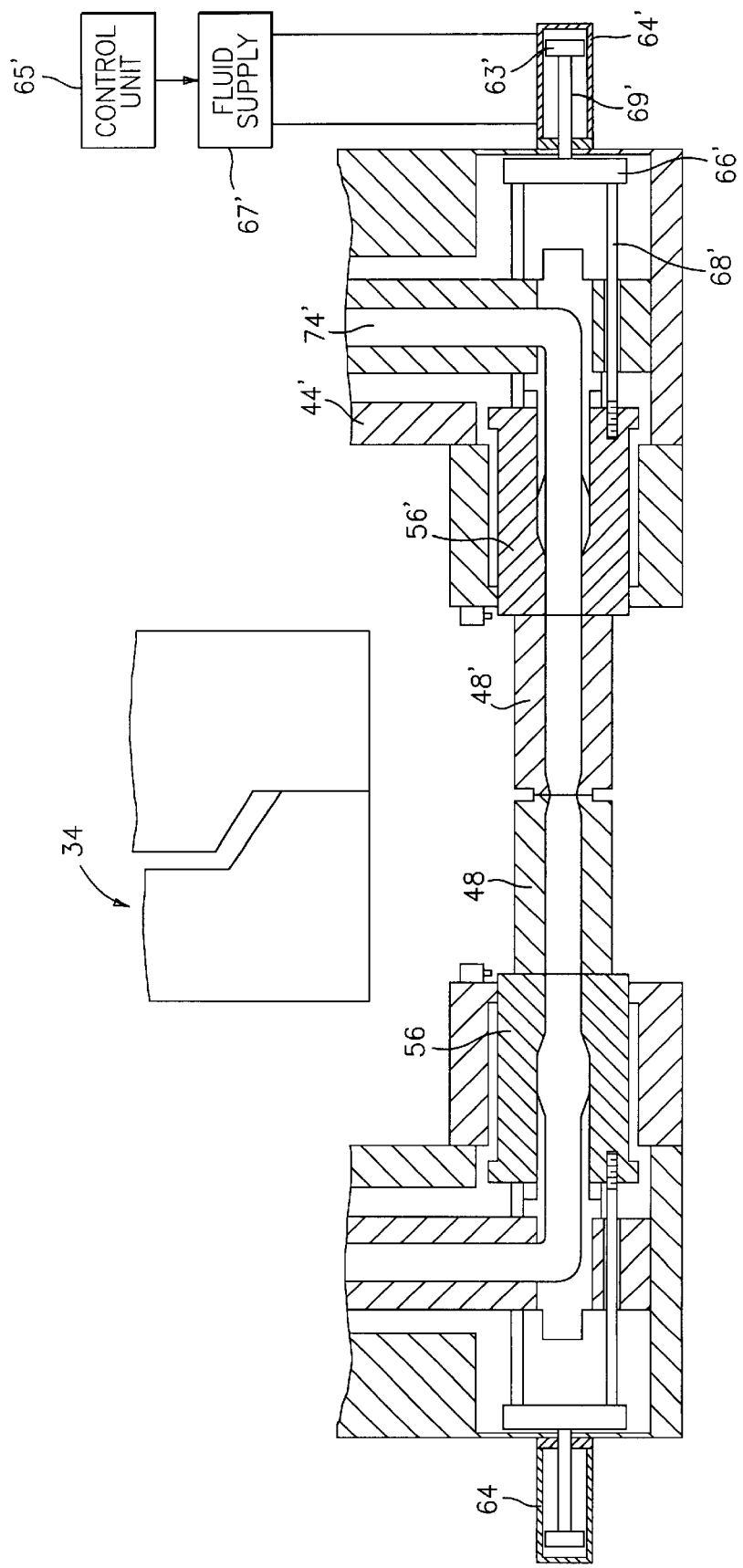
FIG. 12 is a side view in partial cross section of an alternative sprue bar assembly in accordance with the present invention.

FIG. 12 illustrates an alternative sprue bar assembly in which the fixed sprue bar section 46 has been replaced by a second movable or adjustable sprue bar section 48'. By providing two adjustable sections 48 and 48', the range of available motion is effectively doubled. As a result, the assembly has more flexibility in adjusting height for various molds.

As can be seen from FIG. 12, the adjustable sprue bar sections 48 and 48' are aligned with each other. Adjustable sprue bar section 48 operates in the manner discussed hereinabove and is connected to power unit 64 in the manner discussed hereinabove. Adjustable sprue bar section 48' is connected or joined to a movable sleeve 56' positioned within a fixed sprue bar section or manifold 44'. Power unit 64' is provided to extend or retract the sleeve 56' relative to the manifold 44'.

Power unit 64', such as a cylinder unit, has a piston head 63' which is reciprocally movable between the retracted position shown in FIG. 12 and an extended position (not shown). The sleeve 56' is connected to the piston head 631 via the piston rod 69', the crosshead 66' and one or more connecting rods 68'. The power unit 64' communicates with a fluid source 67'. Operation of the power unit 64' is controlled by a control unit 65' such as the closed loop servo control unit previously discussed. If desired, the control unit 65' may be omitted and both power units 64 and 64' may be controlled by a single control unit.

It is apparent that there has been provided in accordance with the present invention a shutheight adjuster for a sprue bar assembly which fully satisfies the means, objects, and advantages set forth hereinbefore. While the present invention has been described in the context of specific embodiments thereof, other variations, alternatives, and modifications will become apparent to those skilled in the art after reading the foregoing description. Therefore, it is intended to embrace such variations, alternatives, and modifications as fall within the broad scope of the appended claims.

What is claimed is:

1. A sprue bar assembly for use with an injection molding machine having at least one mold, said sprue bar assembly accommodating different mold shutheights and comprising:

a fixed sprue bar section having a first channel through which molten material flows, said first channel communicating with a source o f said molten material;

means for accommodating different mold shutheights;

said accommodating means comprising at least one adjustable sprue bar section having a second channel through which molten material flows;

said at least one adjustable sprue bar section having a first position where said at least one adjustable sprue bar section is separated from said fixed sprue bar section and a second position where said at least one adjustable sprue bar section is in contact with said fixed sprue bar section; and said accommodating means further comprising power means for moving said at least one adjustable sprue bar section relative to said fixed sprue bar section to seal said at least one adjustable sprue bar to said fixed sprue bar section and to adjust said at least one adjustable sprue bar section to accommodate different mold shutheights.

2. A sprue bar assembly for use with an injection molding machine having at least one mold, said sprue bar assembly accommodating different mold shutheights and comprising:

a fixed sprue bar section having a first channel through which molten material flows, said first channel communicating with a source of said molten material;

means for accommodating molds having different shutheights;

said accommodating means comprising at least one adjustable sprue bar section having a second channel through which molten material flows;

said accommodating means further comprising powered means for moving said at least one adjustable sprue bar section relative to said fixed sprue bar section; and said powered means holding an end face of said at least one adjustable sprue bar section in contact with and against an opposed end face of said fixed sprue bar section so that molten material can flow from said first channel to said second channel without leaking.

3. A sprue bar assembly according to claim 2, further comprising:

a movable sleeve joined to said at least one adjustable sprue bar section for extending and retracting said at least one adjustable sprue bar section relative to said fixed sprue bar section and thereby changing the length of the sprue bar assembly; and said movable sleeve being actuated by said powered means.

4. A sprue bar assembly for use with an injection molding machine having at least one mold, said sprue bar assembly accommodating different mold shutheights and comprising:

a fixed sprue bar section having a first channel through which molten material flows, said first channel communicating with a source of said molten material;

means for accommodating different mold shutheights;

said accommodating means comprising at least one adjustable sprue bar section having a second channel through which molten material flows;

said accommodating means further comprising powered means for moving said at least one adjustable sprue bar section relative to said fixed sprue bar section;

said powered means including a cylinder having a piston rod; and said piston rod being connected to said movable sleeve via a crosshead and at least one connecting rod.

5. A sprue bar assembly according to claim 4, wherein said at least one connecting rod is joined to said movable sleeve.

6. A sprue bar assembly according to claim 1, further comprising:

said source of molten material comprising a molten material injection unit; and said fixed sprue bar section communicating with said injection unit via a sprue bush and a first fixed manifold, said sprue bush having a third channel communicating with an outlet nozzle of said injection unit and said first fixed manifold having a fourth channel in communication with said first and third channels.

7. A sprue bar assembly according to claim 6, wherein said first fixed manifold is mounted within a stationary platen of said injection molding machine.

8. A sprue bar assembly according to claim 6, wherein said first fixed manifold is mounted onto a surface of a stationary platen of said injection molding machine.

9. A sprue bar assembly for use with an injection molding machine having at least one mold, said sprue bar assembly accommodating different mold shutheights and comprising:

a fixed sprue bar section having a first channel through which molten material flows, said first channel communicating with a source of said molten material;

means for accommodating different mold shutheights;

said accommodating means comprising at least one adjustable sprue bar section having a second channel through which molten material flows;

said accommodating means further comprising powered means for moving said at least one adjustable sprue bar section relative to said fixed sprue bar section;

said source of molten material comprising a molten material injection unit;

said fixed sprue bar section communicating with said injection unit via a sprue bush and a first fixed manifold, said sprue bush having a third channel communicating with an outlet nozzle of said injection unit and said first fixed manifold having a fourth channel in communication with said first and third channels;

a sprue bar mounting section attached to a movable platen of said injection molding machine; and a fifth channel passing through said sprue bar mounting section, said fifth channel communicating with said second channel in said at least one adjustable sprue bar section and with a sixth channel within a manifold positioned within a manifold positioned within said movable platen.

10. A sprue bar assembly according to claim 9, further comprising:
said sprue bar mounting section including a manifold spigot section;
a movable sleeve sliding over said manifold spigot section, said movable sleeve being joined to said at least one adjustable sprue bar section and said powered means; and
said powered means causing said movable sleeve to move so as to extend or retract said at least one adjustable sprue bar section as needed so as to maintain contact between said at least one adjustable sprue bar section and said fixed sprue bar section when said molten material flows from said injection unit to said sixth channel.

11. A sprue bar assembly according to claim 10, wherein said sprue bar mounting section includes a sprue bar mounting bushing fixed to a manifold plate connected to said movable platen and said movable sleeve is guided by said sprue bar mounting bushing.

12. A sprue bar assembly according to claim 11, further comprising a position sensor for detecting the position of the movable sleeve relative to the sprue bar mounting bushing, said position sensor transmitting position signals to a control unit for controlling operation of said powered means.

13. A sprue bar assembly according to claim 2, further comprising:
said injection molding machine having a first mold formed by first and second mold halfs; and
said powered means comprises means for causing said at least one adjustable sprue bar section to maintain contact with said fixed sprue bar section when said first and second mold halfs are in contact with each other and when said first and second mold halfs are slightly separated.

14. A sprue bar assembly for use with an injection molding machine having at least one mold, said sprue bar assembly accommodating different mold shutheights and comprising:
a fixed sprue bar section having a first channel through which molten material flows, said first channel communicating with a source of said molten material;
means for accommodating different mold shutheights;
said accommodating means comprising at least one adjustable sprue bar section having a second channel through which molten material flows;
said accommodating means further comprising powered means for moving said at least one adjustable sprue bar section relative to said fixed sprue bar section;
said powered means holding said at least one adjustable sprue bar section in contact with said fixed sprue bar section so that molten material can flow from said first channel to said second channel without leaking;
said injection molding machine having a first mold formed by first and second mold halfs;
said powered means comprising means for causing said at least one adjustable sprue bar section to maintain contact with said fixed sprue bar section when said first and second mold halfs are in contact with each other and when said first and second mold halfs are slightly separated; and
said powered means further comprising means for causing said at least one adjustable sprue bar section to retract away from said fixed sprue bar section when said mold is fully opened.

15. A sprue bar assembly according to claim 14, wherein said powered means comprises means for causing decompression in said first and second channels prior to separating said at least one adjustable sprue bar section from said fixed sprue bar section.

16. A sprue bar assembly for use with an injection molding machine having at least one mold, said sprue bar assembly accommodating different mold shutheights and comprising:
a fixed sprue bar section having a first channel through which molten material flows, said first channel communicating with a source of said molten material;
means for accommodating different mold shutheights;
said accommodating means comprising at least one adjustable sprue bar section having a second channel through which molten material flows;
said accommodating means further comprising powered means for moving said at least one adjustable sprue bar section relative to said fixed sprue bar section;
said powered means holding said at least one adjustable sprue bar section in contact with said fixed sprue bar section so that molten material can flow from said first channel to said second channel without leaking;
a first valve gate in said fixed sprue bar section for positively closing said first channel when said fixed sprue bar section is not in contact with said at least one adjustable sprue bar section; and
a second valve gate in said at least one adjustable sprue bar section for positively closing said second channel when said at least one adjustable sprue bar section is not in contact with said fixed sprue bar section.

17. A sprue bar assembly according to claim 16, wherein each of said first and second valve gates comprises a valve stem movable between open and closed positions, power means for operating said valve stem, and a link between said power means and said valve stem.

18. A sprue bar assembly according to claim 17, wherein a tip of each of said valve stems is provided with at least one peripheral vent groove and a channel through which molten material can travel to said at least one peripheral vent groove.

19. A sprue bar assembly for use with an injection molding machine having at least one mold, said sprue bar assembly accommodating different mold shutheights and comprising:
a fixed sprue bar section having a first channel through which molten material flows, said first channel communicating with a source of said molten material;
means for accommodating different mold shutheights;
said accommodating means comprising at least one adjustable sprue bar section having a second channel through which molten material flows;
said accommodating means further comprising powered means for moving said at least one adjustable sprue bar section relative to said fixed sprue bar section;
said fixed sprue bar section comprising a fixed manifold section;
said accommodating means comprising a first adjustable sprue bar section movable relative to said fixed manifold section and a second adjustable sprue bar section movable relative to said first adjustable sprue bar section.

20. A sprue bar assembly for use with an injection molding machine having at least one mold, said sprue bar assembly accommodating different mold shutheights and comprising:

a fixed sprue bar section having a first channel through which molten material flows, said first channel communicating with a source of said molten material;

means for accommodating different mold shutheights;

said accommodating means comprising at least one adjustable sprue bar section having a second channel through which molten material flows;

said accommodating means further comprising powered means for moving said at least one adjustable sprue bar section relative to said fixed sprue bar section;

said fixed sprue bar section comprising a fixed manifold section;

said accommodating means comprising a first adjustable sprue bar section movable relative to said fixed manifold section and a second adjustable sprue bar section movable relative to said first adjustable sprue bar section; and said first and second adjustable sprue bar sections being movable between positions where they contact each other and positions where they are separated.

21. A molding machine for making molded parts, said machine comprising:

a stationary platen having a first mold half affixed thereto;

a center platen movable relative to said stationary platen;

said center platen having a second mold half affixed to a first surface and a third mold half affixed to a second surface;

a movable platen which moves relative to said center platen and said stationary platen;

said movable platen having a fourth mold half affixed thereto;

said first and second mold halfs forming a first mold and said third and fourth mold halfs forming a second mold;

an injection unit for providing molten material to said first and second molds;

a manifold in said center platen for distributing said molten material to said first and second molds when said first and second molds are in a mold closed position;

a sprue bar assembly connecting an outlet of said injection unit to said manifold;

said sprue bar assembly having means for accommodating different shutheights of said first and second molds; and said accommodating means comprising powered means for adjusting the length of the sprue bar assembly.

22. A molding machine according to claim 21, wherein said powered means for adjusting the length of the sprue bar assembly comprises an adjustable sprue bar section, a movable sleeve affixed to said adjustable sprue bar section, and power means for moving said movable sleeve so as to cause said adjustable sprue bar section to extend or retract relative to said center platen.

23. A molding machine according to claim 22, wherein said power means comprises a fluid actuated cylinder unit joined to said movable sleeve.

24. A molding machine according to claim 22, wherein:

said sprue bar assembly includes a melt channel which extends from said outlet of said injection unit to said manifold for carrying molten material under pressure; and said movable sleeve is movable by said power means so as to reduce the pressure in said melt channel.

25. A molding machine according to claim 21, wherein said sprue bar assembly includes a fixed sprue bar section and said movable sleeve is operated by said power means to retract said adjustable sprue bar section from said fixed sprue bar section.

26. A molding machine according to claim 25, wherein each of said sprue bar sections has a valve gate for substantially preventing drooling of molten material within said sections when said adjustable sprue bar section is retracted from said fixed sprue bar section.

27. A molding machine according to claim 21, wherein said first mold opens and closes at different times than said second mold.

28. A molding machine according to claim 21, wherein said first and second molds open and close at the same time.

29. A molding machine according to claim 21, wherein said accommodating means comprises a first adjustable sprue bar section and a second adjustable sprue bar section.

30. A molding machine comprising:

a mold formed by first and second mold halfs;

a sprue bar assembly for feeding a metered amount of molten material into the mold; and said sprue bar assembly including means for reducing the length of said sprue bar assembly as said mold is moved from a partially open position to a fully closed position.

31. A molding machine comprising:

a mold formed by first and second mold halfs;

a sprue bar assembly for feeding a metered amount of molten material into the mold;

said sprue bar assembly including means for adjusting the length of said sprue bar assembly when said mold is moved to a fully closed position; and said sprue bar assembly including a fixed sprue bar section and an adjustable sprue bar section which mates with said fixed sprue bar section when said mold is partially closed and wherein said adjusting means comprises a movable sleeve connected to said adjustable sprue bar section and a power unit joined to said movable sleeve.

32. A molding machine according to claim 31, wherein said power unit moves said movable sleeve and said adjustable sprue bar section so as to cause said length of said sprue bar assembly to decrease as said mold moves from a partially closed position to said fully closed position.

33. A molding machine according to claim 32, wherein said power unit moves said movable sleeve so as to maintain contact between said adjustable sprue bar section and said fixed sprue bar section as said mold moves from said fully closed position to a partially open position.

34. A molding machine according to claim 33, wherein said power unit moves said movable sleeve so as to break contact between said adjustable sprue bar section and said fixed sprue bar section as said mold moves from said partially open position to a full open position.

35. A molding machine comprising:

a mold formed by first and second mold halfs;

a sprue bar assembly for feeding a metered amount of molten material into the mold;

said sprue bar assembly including means for adjusting the length of said sprue bar assembly when said mold is moved to a fully closed position;

said sprue bar assembly including a fixed sprue bar section and an adjustable sprue bar section which mates with said fixed sprue bar section when said mold is partially closed and said adjusting means comprises a movable sleeve connected to said adjustable sprue bar section and a power unit joined to said movable sleeve;

said power unit moving said movable sleeve and said adjustable sprue bar section so as to cause said length of said sprue bar assembly to decrease as said mold moves from a partially closed position to said fully closed position;

said power unit moving said movable sleeve so as to maintain contact between said adjustable sprue bar section and said fixed sprue bar section as said mold moves from said fully closed position to a partially open position;

said power unit moving said movable sleeve so as to break contact between said adjustable sprue bar section and said fixed sprue bar section as said mold moves from said partially open position to a full open position; and each of said adjustable sprue bar section and said fixed sprue bar section being provided with a valve gate to prevent leakage of molten material.

36. A molding machine comprising:

a mold formed by first and second mold halfs;

a sprue bar assembly for feeding a metered amount of molten material into the mold;

said sprue bar assembly including means for adjusting the length of said sprue bar assembly when said mold is moved to a fully closed position; and said sprue bar assembly for feeding a metered amount of molten material into said mold feeding said molten material into said mold while said mold is in a closed but unclamped condition and said sprue bar assembly adjusting in length as said mold opens as said metered amount of molten material is injected therein and then moves toward a fully closed position so as to compress the molten material.

37. A molding machine comprising:

a mold formed by first and second mold halfs;

a sprue bar assembly for feeding a metered amount of material into the mold;

said sprue bar assembly including means for adjusting the length of said sprue bar assembly when said mold is moved to a fully closed position; and said sprue bar assembly for feeding a metered amount of molten material into said mold feeding said molten material into said mold while said mold is partially closed and said sprue bar assembly adjusting in length as said mold moves from said partially closed position to said fully closed position.

38. A molding machine comprising:

a stationary platen having a first mold half affixed thereto;

a moving platen having a second mold half affixed thereto;

said first and second mold halfs when in a closed position forming a mold for producing a molded article;

means for injecting multiple plastic materials into said mold;

said injecting means including a hot runner manifold mounted to said moving platen for supplying one of said plastic materials to said mold, a source of said one plastic material, and an adjustable length sprue bar assembly joining said manifold and said source for transmitting said one plastic material from said source to said manifold; and said adjustable length sprue bar assembly including a fixed sprue bar section and a movable sprue bar assembly which can be moved from a first position abutting said fixed sprue bar section to a second position spaced from said fixed sprue bar section; and said movable sprue bar assembly being movable independently of said moving platen.

39. A molding machine according to claim 38, wherein said adjustable length sprue bar assembly includes powered means to adjust the length of said sprue bar assembly.

40. A molding machine according to claim 39, wherein said adjustable length sprue bar assembly includes an adjustable sprue bar section which extends or retracts relative to said manifold and said powered means comprises a power unit connected to said adjustable sprue bar section via an adjustable sleeve.

41. A molding machine comprising:

a stationary platen having a first mold half affixed thereto;

a moving platen having a second mold half affixed thereto;

said first and second mold halfs when in a closed position forming a mold for producing a molded article;

means for injecting multiple plastic materials into said mold;

said injecting means including a hot runner manifold mounted to said moving platen for supplying one of said plastic materials to said mold, a source of said one plastic material, and an adjustable length sprue bar assembly joining said manifold and said source for transmitting said one plastic material from said source to said manifold;

said adjustable length sprue bar assembly including powered means to adjust the length of said sprue bar assembly;

said adjustable length sprue bar assembly including an adjustable sprue bar section which extends or retracts relative to said manifold and said powered means comprising a power unit connected to said adjustable sprue bar section via an adjustable sleeve; and said power unit comprising a fluid actuated piston cylinder unit and said piston cylinder unit being connected to said adjustable sleeve via a crosshead and at least one connecting rod.

42. A process for making a molded article, said process comprising:

providing a mold formed by first and second mold halfs and a sprue bar assembly for receiving molten material from a molten material source;

feeding a metered amount of molten material into the mold while said mold is partially closed; and adjusting the length of said sprue bar assembly as said mold is moved to a fully closed position.

43. A process according to claim 42, wherein said sprue bar assembly providing step comprises providing a fixed sprue bar section, an adjustable sprue bar section, and power means for moving said adjustable sprue bar section and said adjusting step comprises operating said power means so as to reduce the length of said sprue bar assembly while maintaining contact between said fixed sprue bar section and said adjustable sprue bar section.

44. A process according to claim 43, further comprising operating said power means to increase the length of said sprue bar assembly and maintain contact between the fixed sprue bar section and the adjustable sprue bar section as said mold moves from said closed position to a partially open position.

45. A process according to claim 44, further comprising operating said power means to separate said adjustable sprue bar section from said fixed sprue bar section as said mold moves from said partially open position to a fully open position.

46. A process according to claim 45, further comprising providing valve gates within each of said adjustable sprue bar section and said fixed sprue bar section and moving said valve gates from an open position to a closed position as said adjustable sprue bar section is moved away from said fixed sprue bar section.

47. A process for making a molded article, said process comprising:
providing a mold formed by first and second mold halfs and a sprue bar assembly for receiving molten material from a molten material source;
feeding a metered amount of molten material into the mold while said mold is in a closed but unclamped condition; and
adjusting the length of said sprue bar assembly as said mold opens as said metered amount of molten material is injected into said mold and as said mold then moves toward a fully closed position so as to compress the molten material.

48. A process according to claim 47, wherein said sprue bar assembly providing step comprises providing a fixed sprue bar section, an adjustable sprue bar section, and power means for moving said adjustable sprue bar section and said adjusting step comprises operating said power means so as to reduce the length of said sprue bar assembly while maintaining contact between said fixed sprue bar section and said adjustable sprue bar section as said mold moves from said open position to said fully closed position.

49. A molding machine comprising:
two platens each having a mold half affixed thereto for forming a mold, at least one of said platens moving relative to the other of said platens;
said at least one moving platen having a manifold;
a source of molten material;
a sprue bar assembly communicating with said source of molten material and said manifold;
said sprue bar assembly including a fixed sprue bar section and an adjustable sprue bar section;
powered means for moving said adjustable sprue bar section relative to said manifold between a first position where said adjustable sprue bar section contacts said fixed sprue bar section and a second position where said adjustable sprue bar section does not contact said fixed sprue bar section; and
a control unit for operating said adjustable sprue bar section.

50. A molding machine according to claim 49, wherein said powered means comprises a cylinder and said control unit determines when said cylinder should move, how much said cylinder should move, in which direction said cylinder should move, and what degree of force said cylinder should apply.

51. A molding machine according to claim 50, wherein:
said powered means includes an adjustable sleeve connected to said adjustable sprue bar section;
said source of molten material comprises an injection unit having a feedscrew and an injection cylinder for supplying molten material under an injection pressure; nd
said control unit receives at least one input from the group consisting of a position of at least one of the machine's platen, a position of said adjustable sleeve relative to said manifold, a position of said feedscrew, a position of said injection cylinder, said injection pressure, and timing of an injection start sequence, a switch to hold pressure, an end of hold pressure, a start of opening of said mold formed by said mold halfs, and an end of mold closing.

52. A sprue bar assembly for use with an injection molding machine having at least one mold, said sprue bar assembly accommodating different mold shutheights and comprising:
a first adjustable sprue bar section having a first channel through which molten material flows, said first channel communicating with a source of said molten material;
a second adjustable sprue bar section having a second channel through which molten material flows;
said first and second adjustable sprue bar sections allowing said assembly to accommodate said different mold shutheights; and
powered means for holding said first and second adjustable sprue bar sections in contact with each other so that molten material can flow from said first channel to said second channel without leaking and for moving at least one of said first and second adjustable sprue bar sections to a retracted position where said first and second adjustable sprue bar sections are not in contact with each other.

53. A sprue bar assembly for use with an injection molding machine having at least one mold, said sprue bar assembly accommodating different mold shutheights and comprising:
a first adjustable spire bar section having a first channel through which molten material flows, said first channel communicating with a source of said molten material;
a second adjustable sprue bar section having a second channel through which molten material flows;
said first and second adjustable sprue bar sections allowing said assembly to accommodate said different mold shutheights;
powered means for holding said first and second adjustable sprue bar sections in contact with each other so that molten material can flow from said first channel to said second channel without leaking;
a fixed manifold section; and
a first movable sleeve mounted within said fixed manifold section, said first movable sleeve joined to said first adjustable sprue bar section for extending and retracting said first adjustable sprue bar section relative to said fixed manifold section, thereby changing the length of the sprue bar assembly.

54. A sprue bar assembly according to claim 53, further comprising:
a second manifold section; and
a second movable sleeve mounted within said second manifold section, said second movable sleeve joined to said second adjustable sprue bar section for extending and retracting said second adjustable sprue bar section relative to said second manifold section, thereby changing the length of the sprue bar assembly.

55. A sprue bar assembly according to claim 54, further comprising said powered means actuating said first and second movable sleeves.

56. A sprue bar assembly according to claim 55, wherein said powered means comprises a first fluid actuated unit connected to said first movable sleeve and a second fluid actuated unit connected to said second movable sleeve.

57. A sprue bar assembly according to claim 56, further comprising means for controlling the operation of said first and second fluid actuated units.

58. A valve gate assembly for closing off a material transporting passageway comprising:

a valve stem movable between an open position and a closed position; and said valve stem having a tip portion, a channel within said tip portion, and at least one external vent groove joined to said channel, said at least one external vent groove surrounding the periphery of said valve stem.

59. A valve gate assembly according to claim 58, further comprising:

a piston cylinder unit; and a pivotable link connected to an end of said valve stem and said position cylinder unit.

60. A mechanism for sealing two adjacent material transporting passageways comprising:

a first gate valve assembly located in a first passageway;

said second valve gate assembly located in a second passageway;

each valve gate assembly having a valve stem movable between an open and a closed position;

each valve stem having a tip portion, at least one external peripheral groove surrounding the periphery of said valve stem, and a channel at said tip portion communicating with said at least one external peripheral groove; and said channel in each said valve stem tip portion removing any material trapped between said valve stems as said valve stems move to their closed positions.

61. A valve gate assembly for closing off a material transporting passageway comprising:

a valve stem movable between an open position and a closed position;

said valve stem having a longitudinal axis, a tip portion, a channel within said tip portion, and at least one external vent groove surrounding the periphery of said valve stem; and said channel communicating with said at least one external vent groove and having a first portion extending coaxially with said longitudinal axis and a second portion angled with respect to said longitudinal axis.

* * * * *